Dec. 4, 1928.

A. C. LUSHER 1,693,610

ART OF PRODUCING TUBULAR ARTICLES

Filed Feb. 2, 1922   3 Sheets-Sheet 1

Inventor
Albert C. Lusher
By his Attorneys

Dec. 4, 1928.

A. C. LUSHER

ART OF PRODUCING TUBULAR ARTICLES

Filed Feb. 2, 1922

Inventor
Albert C. Lusher
By his Attorneys

Dec. 4, 1928.

A. C. LUSHER 1,693,610

ART OF PRODUCING TUBULAR ARTICLES

Filed Feb. 2, 1922    3 Sheets-Sheet 3

Inventor
Albert C. Lusher
By his Attorneys

Patented Dec. 4, 1928.

1,693,610

UNITED STATES PATENT OFFICE.

ALBERT C. LUSHER, OF WATERBURY, CONNECTICUT, ASSIGNOR TO SCOVILL MANUFACTURING CO., OF WATERBURY, CONNECTICUT, A CORPORATION OF CONNECTICUT.

ART OF PRODUCING TUBULAR ARTICLES.

Application filed February 2, 1922. Serial No. 533,705.

This invention relates to an improvement in tubular articles and the art of producing them, and more particularly tubular blanks for tire valve-casings.

A commonly used tire valve unit comprises a headed casing having an internal bore and designed to extend through the tire and the rim of the wheel, the head serving to prevent withdrawal. Adjacent the head, the casing is grooved circumferentially to form a seat for the edge of the tire at its opening. The exterior of the casing is threaded to receive a dust cap and a lock or clamp nut. The outer or unheaded end of the casing is of reduced diameter and is threaded on its interior to permit screwing in of the valve mechanism and on its exterior to receive a valve cap. Inside the casing is an abutment for the valve mechanism, having provision for the passage of air.

According to one commercial method of producing these valve casings, a solid rod is formed and is headed by forging or the like. The rod is threaded and the unheaded end is reduced in diameter. This forms what may be termed a valve-casing blank. Further operations, for transforming this blank into a completed valve-casing, include boring the rod to form the central air passage, the boring operation being of such character as to leave an abutment for the valve mechanism; grooving the casing circumferentially adjacent the head; and threading the reduced end inside and out. Objections to this method are the relatively high cost due to waste of material and the uneconomical boring operation.

In producing tubes by extrusion with apparatus of the type including a ram and a piercing-mandrel, it has been found that a considerable waste of metal results from an uneven or dead end at the part of the product first emerging from the die. Furthermore, in extruding tubes by apparatus of the type mentioned it has been found that the strains on the piercing-mandrel during the piercing of the slug or blank sometimes throw the former out of alinement.

It is one of the principal objects of the present invention to provide an improved method of producing valve-casing blanks that makes possible a substantial saving in material and other costs.

It is a further object of the invention to provide a method of producing tubes by extrusion such that the dead-end waste, or the greater part thereof, and the tendency toward disalinement of the piercing mandrel, are avoided.

With these general objects and others which will be obvious to those skilled in the art in view, the invention consists in the methods and the articles of manufacture which will first be described, in connection with the accompanying drawings, and then more particularly pointed out.

Figure 1:
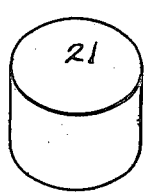
Fig. 1 is a perspective view of one form of slug.
Figure 2:
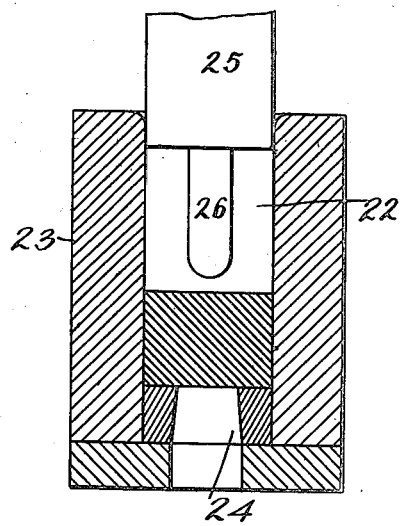
Fig. 2 is a conventional view in cross section of an extrusion apparatus adapted to carry out part of the invention.
Figure 3:
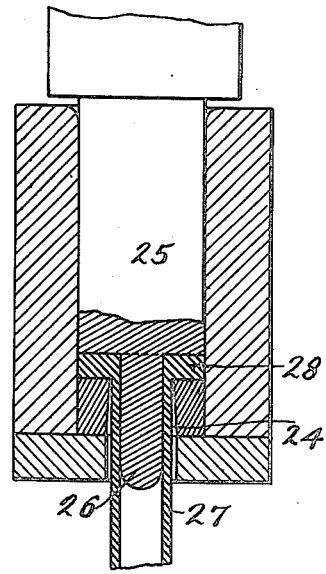
Fig. 3 is a similar view showing the plunger in a different position, with the slug extruded into the form of a tube.
Figure 4:
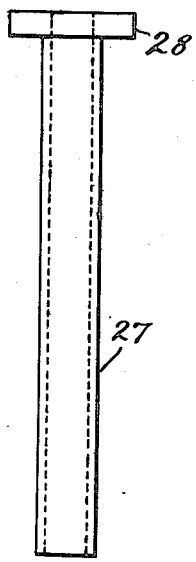
Fig. 4 is a side view of a headed tubular blank suitable for conversion into a valve-casing.
Figure 5:
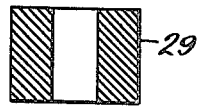
Fig. 5 is a sectional view of a previously pierced slug.

In producing valve-casing blanks according to the invention in its entirety, a headed tube is formed by extrusion. This extrusion operation may be carried out in any suitable manner. As an example, the drawings illustrate, more or less conventionally, apparatus capable of forming these tubes. Referring to Figs. 1 to 3, a slug 21 of suitable material and form, hereinafter more fully referred to, is placed in the chamber 22 of a container 23 having a die opening 24 and cylindrical in form. The slug illustrated at 21 is a solid, round slug which may be formed by casting, cutting from a rod or the like. The slug is acted upon by a plunger comprising a ram 25 which substantially fits the chamber 22 and a piercing mandrel 26 of smaller diameter, this plunger being reciprocated by any suitable press mechanism. As the plunger is moved against the slug, the piercing mandrel, in the exemplification referred to, first pierces the slug. By the time the ram 25 engages the slug, the piercing mandrel extends into the die opening and acts as a mandrel. Since the only escape for the metal is between the die and the mandrel, the pressure of the ram extrudes the slug into the form of a tube 27. By stopping the plunger movement at the proper time, a portion of the slug is left unextruded, as illustrated in Fig. 3, and this portion becomes the head 28 of the extruded tube. It will be understood that the outer and inner diameters of the extruded tube depend on the dimensions of the die opening and mandrel respectively.

Instead of the solid slug 21, a previously pierced slug 29 may be used, the part 26 of the plunger merely passing through the bore of the slug and thereafter acting as a mandrel as just described. Various other forms of slugs may be used in extruding headed tubes for valve-casing blanks and other tubular articles.

Figure 6:
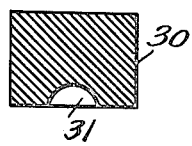
Figs. 6 and 7 are sectional views of different forms of slugs.
Figure 7:
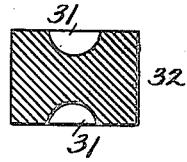
Figure 8:
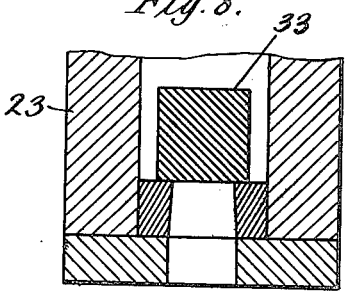
Fig. 8 is a view similar to Fig. 2, with a different form of slug in position for extrusion.

For example, to prevent the waste resulting from uneven, dead ends above mentioned, the slug may be of a character to obviate the premature flow of metal through the die opening upon initial pressure of the plunger. This is accomplished by using a slug having a cavity or depression in the face toward the die opening. This depression may be conveniently formed by upsetting the metal of a blank by means of suitable punches, the blank being of a shape similar to slug 21 or of any other suitable form. Fig. 6 illustrates a round slug 30 with a cavity 31 in one face and Fig. 7 shows a similar slug 32 having a cavity in both faces. With slugs having this double cavity, the face toward the die opening will always have a cavity regardless of how the slugs are fed to the chamber.

The slug being confined in the chamber, such as that described, upon initial pressure of the piercing mandrel the initial flow of the metal is such as to tend to fill up the cavity 31, rather than a premature flow through the die opening. Thereafter, the piercing of the slug and the extrusion into a tube are as above described.

Figure 9:
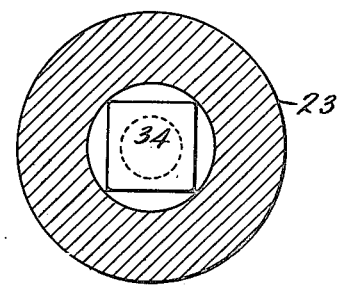
Fig. 9 is a transverse cross sectional view through the container chamber above a slug of still different form.
Figure 10:
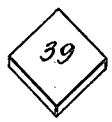
Fig. 10 is a perspective view of an abutment blank.
Figure 11:
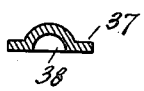
Fig. 11 is a cross sectional view of this blank after cupping.
Figure 13:
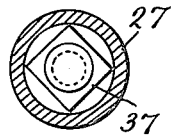
Fig. 13 is a transverse sectional view through the tubular blank.
Figure 15:
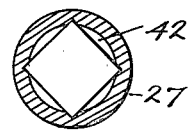
Fig. 15 is a transverse cross sectional view through the tubular blank after the abutment is anchored in place.

In carrying out the invention in its entirety, a slug is used that is adapted to permit a radial flow of metal toward the wall of the chamber. This may be accomplished by using a round slug 33 like slug 21 but substantially smaller in diameter than the chamber. Or the slug may have a transverse cross section that is non-circular. A convenient form of slug is one that is substantially a cube or other parallelopipedon, the edges being slightly rounded, such a slug being shown at 34 in Fig. 9. This slug may be formed in any suitable manner as by casting or cutting from rod stock. It may advantageously have the facial cavity already described. When a small sized round slug or a slug of non-circular transverse cross section is subjected to the pressure of the extrusion plunger, there is an initial radial flow of metal in all directions toward the wall of the chamber. This initial radial flow relieves to a great extent, the strain on the piercing mandrel during its piercing operation and so tends to prevent disalinement thereof. By using a slug substantially square in cross section with its diagonals only enough shorter than the chamber diameter to permit proper insertion, the slug is self-centering when fed to the chamber. Furthermore this form of slug is an advantageous means between maximum cross-sectional area and maximum flow-receiving space.

In carrying out the invention in what is considered the most advantageous manner, the headed tube for the valve-casing blank, or other similar tubular article, is extruded from a heated slug of a composition capable of hot extrusion and subsequent cold working. As an example the composition may be copper from 60 to 62%, lead from 1 to 2%, and zinc by difference.

Following the extrusion operation, the headed tube 27 is preferably annealed to soften the metal preparatory to the cold working operations to be described, and, if necessary, the tube is cut to proper length. While the length of the tube is governed largely by the size of the slug, a certain amount of trimming is sometimes necessary.

There is provided, in the interior of the tube, an abutment which, as above mentioned, serves as a seat for certain parts of the valve mechanism with which the completed casing is used. This abutment may, for example, consist of a diaphragm or plate inserted and anchored in the tube, and the anchoring operation may be effected by causing a portion of the periphery of the abutment plate to dig or bite into the metal wall of the tube.

Figure 12:
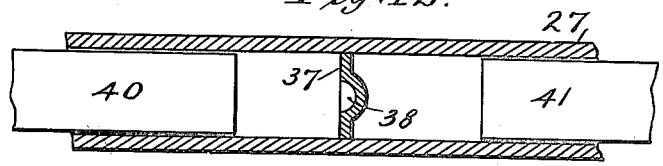
Fig. 12 is a sectional view through a tubular blank with an abutment plate inserted and with punches about to act on the same.
Figure 14:
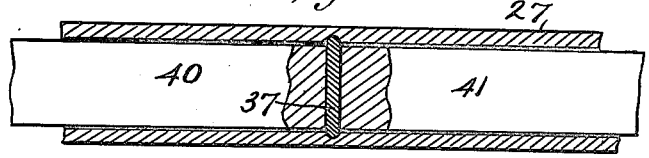
Fig. 14 is a view similar to Fig. 12 showing the punches at the end of their stroke.

Figs. 10–15 illustrate, as an example, a convenient form of abutment and an advantageous manner of anchoring the same. In this exemplification, the abutment plate 37 is substantially square in outline, having slightly rounded corners, and is cupped, as at 38, Fig. 11. This plate is made of any suitable material, preferably harder than brass and rust proof. For example, it may be made of stainless steel or steel or iron plated with nickel or tin. The cupped plate may conveniently be formed by suitable punches from a flat blank 39, Fig. 10. The plate 37 is inserted in the tube in any suitable manner, as by hand. It is then subjected to opposing forces which causes it to spread transversely, by reducing the cupped portion, so as to cause the corners to dig or bite into the metal of the tube wall. This may be accomplished, for example, by opposing punches substantially fitting the inside of the tube and operated in any suitable manner. Fig. 12 illustrates opposing punches 40, 41 entering the tube. Fig. 14 shows the punches at the end of their stroke. The cupped plate has been flattened out and the corners thereof have dug or bitten into the wall of the tube, the abutment being thereby firmly anchored.

Figure 20:
Fig. 20 is a view similar to Fig. 10 showing a different form of abutment blank.
Figure 21:
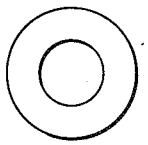
Fig. 21 is a top plan view of the die shown in Figs. 2 and 3.

Instead of the square abutment described, it may be triangular as shown at 137, Fig. 20 and other shapes are possible. Square or triangular plates, however, are conveniently formed, lend themselves readily to the anchoring process, and their shape, in connection with the cylindrical tube, automatically provides air passages, as at 42, Fig. 15.

This method of providing the abutment element makes possible an economical provision of an abutment in a tubular blank. Furthermore, the abutment, although formed from a separate piece, is firmly anchored in position, becoming in effect, a unit with the tube.

Figure 16:
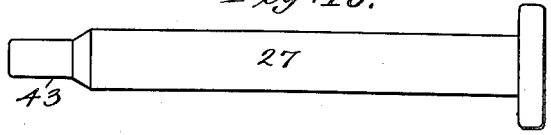
Fig. 16 is a side view of the tubular blank with its end reduced.

The formation of the valve-casing blank may include reduction of the diameter of the unheaded end of the tube. This may be accomplished, for example, by a series of draw-punch operations in a dial press, an apparatus well known to those skilled in the art. Or it may be done in a swaging machine. This step is illustrated in Fig. 16, which shows the reduced end 43.

It is possible to anchor an abutment for the valve mechanism in a manner other than that above described. For example, the tube may have a recess formed in its inner wall and an abutment having a resilient part may be anchored in the tube by causing such resilient part to spring into the recess. An exemplification of this motive is illustrated in Figs. 23–26. As here shown, a tube such as that already described, has in its inner wall a recess in the form of a circumferential groove 44. This groove may be formed by any suitable recessing tool, this recessing being conveniently done prior to the reduction of the unheaded end of the tube. The abutment here illustrated comprises a shell 45 the skirt of which is slit or notched, as at 46, and has a circumferential bead 47. This shell may be formed by any suitable manner as by the cut and draw process or by an eyelet machine. The shell is of such size that contraction of the slit skirt is necessary to permit the bead to pass into the tube. The shell may be inserted and pushed into the tube in any suitable manner, as by a single punch like the punches 40, 41. The shell is forced through the tube until the bead 47 reaches the groove 44, whereupon the contracted skirt expands to normal position springing the bead into the groove and thus anchoring the abutment in place.

The method of providing an abutment just described has the advantage that the abutment can be inserted after the tube end has been reduced.

The abutment may have provision for centering the abutting end of the valve stem. This feature is exemplified in connection with the abutment just described. As here shown, the shell 45, has at its upper end toward the unheaded end of the tube, a cup 48. When the abutment is anchored in place as above described and the valve mechanism is inserted, the cup 48 provides a centering seat for the abutting valve stem that maintains the latter in substantial alinement.

Figure 22:
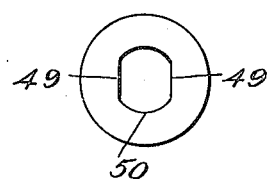
Fig. 22 is a similar view of a modified form of die.
Figure 26:
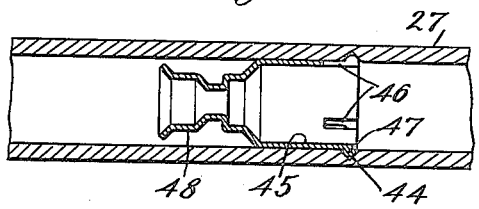
Fig. 26 is a view similar to Fig. 23 showing the abutment anchored in place.
Figure 23:
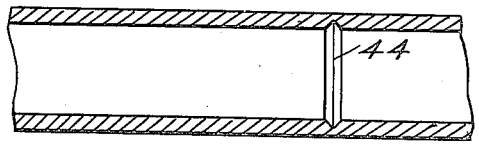
Fig. 23 is a longitudinal sectional view of a part of the tubular blank provided with an internal groove.
Figure 24:
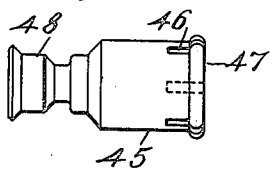
Fig. 24 is a side view of an abutment.
Figure 25:
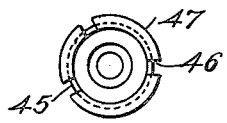
Fig. 25 is an end view thereof.

The completed tire valve unit, as usually constructed has two flat sides on the exterior of the tubular casing. In case the blank comprises a cylindrical tube such as described, these plates may be cut in a milling machine or the like. The tubular blank, however, may be given its flat sides prior to the threading and other operations. For example, it may be extruded to shape. This may be accomplished by extruding the slug through a die opening such as illustrated in Fig. 22.

This die opening is defined by two parallel straight lines 49 and two opposing curved lines 50 which are preferably arcs of a circle.

It will be clear that a tubular blank extruded through the die opening just described will have two flat sides.

Figure 18:
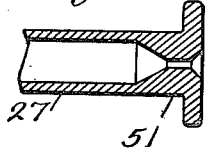
Fig. 18 is a cross sectional view of part of the tubular blank with thickened wall.

As before stated, the completed valve casing has a circumferential groove adjacent the head. In order to provide a wall thick enough to take such a groove, at the same time retaining an otherwise thin-walled tube, the wall of the tubular blank may be thickened adjacent the head so as to be capable of taking a groove. While this may be accomplished in various ways, this step is conveniently carried out by making the initial head 28 of the tube oversize in respect to thickness, and causing some of the metal of the head to flow into the tube. By means of any suitable mechanism, this oversize head is pressed or squeezed in a manner to cause a flow of the metal toward the interior of the tube. This metal displacement forms a thickened wall 51 adjacent the head, in some such manner as that illustrated in Fig. 18, that is adapted to receive a groove.

Figure 19:
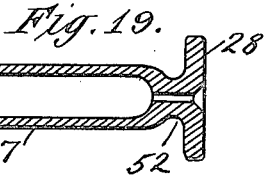
Fig. 19 is a similar view with the thickened wall grooved.

Fig. 19 illustrates the thickened wall after being grooved, as at 52.

Figure 17:
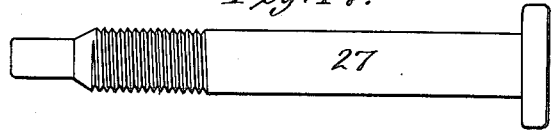
Fig. 17 is a similar view with the exterior threaded.

The formation of the valve casing blank may also include threading the exterior of the tubular blank 27. This operation may be carried out by means of any suitable thread forming apparatus. Fig. 17 illustrates the tubular blank after threading, a part only of the thread being shown.

It will be understood that the completion of the valve-casing involves reaming and threading the reduced end 43 and possibly other finishing operations. But the above enumerated steps, or a part thereof, provide an improved valve-casing blank which may be converted into a casing of the form desired and into which the valve mechanism may be inserted. It will be understood also that there may be changes in the order of the operations described.

What is claimed is:

1. The herein described method of producing partially assembled tire valves which comprises extruding a slug into a headed tube, annealing said tube, positioning therein an abutment for a valve mechanism, threading the exterior of said tube, reducing the unheaded end of the tube, and forming, adjacent the head, a thickened wall for the tube, capable of being grooved.

2. The herein described method of producing partially assembled tire valves which comprises extruding a slug into a headed cylindrical tube having substantially uniform inner and outer diameters throughout, and causing some of the metal of the head to flow into the tube, to provide a thickened wall and grooving said thickened wall.

In testimony whereof, I have hereunto set my hand.

ALBERT C. LUSHER.